United States Patent
Labuhn et al.

(10) Patent No.: US 6,223,117 B1
(45) Date of Patent: Apr. 24, 2001

(54) CUT-IN MANAGEMENT FOR AN ADAPTIVE CRUISE CONTROL SYSTEM

(75) Inventors: Pamela Irene Labuhn, Shelby Township, Macomb County; William Joseph Chundrlik, Jr., Rochester Hills; Scott Anthony Rush, Warren, all of MI (US)

(73) Assignee: General Motors Corporation, Detroit, MI (US)

( * ) Notice: Subject to any disclaimer, the term of this patent is extended or adjusted under 35 U.S.C. 154(b) by 124 days.

(21) Appl. No.: 08/863,228

(22) Filed: May 27, 1997

(51) Int. Cl.[7] ............................... G06F 7/00; B60T 8/32; G05D 1/00
(52) U.S. Cl. ............................... 701/93; 701/96; 701/94; 701/97; 701/301; 340/902; 340/903; 340/435; 340/436; 180/169
(58) Field of Search ................................ 701/70, 93, 96, 701/97, 300, 301, 302, 94; 340/436, 438, 435, 903, 904, 901, 902; 180/169, 168, 167, 170, 178, 171, 271; 342/70, 71, 455, 69; 702/158, 97; 250/559.38, 222.1; 356/141.1

(56) References Cited

U.S. PATENT DOCUMENTS

| | | | |
|---|---|---|---|
| 4,622,636 | * 11/1986 | Tachibana | 701/96 |
| 4,716,298 | * 12/1987 | Etoh | 250/559.38 |
| 4,786,164 | * 11/1988 | Kawata | 180/168 |
| 5,215,159 | * 6/1993 | Nishida | 180/169 |
| 5,234,071 | * 8/1993 | Kajiwara | 701/96 |
| 5,388,048 | * 2/1995 | Yavnayi et al. | 701/301 |
| 5,396,426 | * 3/1995 | Hibino et al. | 180/170 |
| 5,529,139 | * 6/1996 | Kurahashi et al. | 701/96 |
| 5,659,304 | * 8/1997 | Chakraborty | 701/96 |
| 5,675,518 | * 10/1997 | Kuroda et al. | 701/96 |
| 5,684,473 | * 11/1997 | Hibino et al. | 180/271 |
| 5,751,211 | * 5/1998 | Shirai et al. | 701/300 |

* cited by examiner

Primary Examiner—Jacques H. Louis-Jacques
(74) Attorney, Agent, or Firm—Jeffrey A. Sedlar (57) ABSTRACT

A vehicle having an adaptive cruise control system with active deceleration control responds to capture of new in-path vehicles which violate a predetermined inter-vehicle spacing to attenuate unnecessarily aggressive deceleration responses. New in-path vehicles may be identified by inordinate changes in inter-vehicle spacing. Deceleration response of the system to controlled vehicle closing rate and new in-path vehicle deceleration preferably remain unattenuated.

13 Claims, 5 Drawing Sheets

CUT-IN MANAGEMENT FOR AN ADAPTIVE CRUISE CONTROL SYSTEM

TECHNICAL FIELD

The present invention generally is related to vehicle speed control and, more particularly, is related to adaptive cruise control systems.

BACKGROUND OF THE INVENTION

This invention is related to commonly assigned and co-pending U.S. patent application corresponding to attorney docket No. H-196872.

Conventional cruise control systems control vehicle speed to an operator set speed. Adaptive cruise control systems are known which have varying degrees of interaction with preceding vehicles. A general objective of adaptive cruise control systems is to sense in-path objects such as preceding vehicles and to provide throttle control to maintain a predetermined distance therefrom. Such base systems are characterized by passive deceleration, that is to say deceleration effectuated during closed-throttle coast.

An exemplary adaptive cruise control system employing active vehicle deceleration, that is to say deceleration effectuated by active, controlled application of the vehicle service brakes, is disclosed in U.S. Pat. No. 5,173,859 to Deering, hereafter "Deering", also assigned to the assignee of the present invention. Deering describes a system wherein vehicle braking control is invoked to decelerate a succeeding vehicle when the succeeding vehicle violates a predetermined range from the preceding vehicle with a range rate indicating that the succeeding vehicle is closing on a preceding vehicle. Such is generally experienced when the preceding vehicle undergoes deceleration due to service brake application.

Vehicle cut-ins, that is to say introduction of a new preceding vehicle in a succeeding vehicle's pathway, commonly occur while operating a vehicle on multi-lane roadways. Cut-ins are operating situations generally characterized by one vehicle changing lanes in front of and/or behind another vehicle. The vehicle changing lanes may affect the operation of an adaptive cruise control system of a vehicle behind itself or, in the case where the vehicle changing lanes is equipped with an adaptive cruise control system, may have its operation affected by the lane change. This is particularly true where the inter-vehicle spacing between the preceding and succeeding vehicles subsequent to the lane change is relatively small. Such cut-ins may result in aggressive active deceleration of the succeeding vehicle based upon violation of inter-vehicle spacing objectives of the system. However, cut-ins are frequently characterized by the lane changing vehicle having a nearly equivalent speed as the adjacent lane vehicle(s). Hence, active deceleration of the succeeding vehicle may be too aggressive for cut-ins characterized by a relatively minor speed differential between the preceding and succeeding vehicles subsequent to the cut-in maneuver.

SUMMARY OF THE INVENTION

The present invention is implemented in a succeeding vehicle having an adaptive cruise control system which provides active deceleration of the succeeding vehicle in accordance with a predetermined deceleration function of inter-vehicle spacing between itself and a preceding vehicle. Deceleration of the succeeding vehicle is managed by the control by first discerning the introduction of a new preceding vehicle into the path of the succeeding vehicle. The new preceding vehicle may be, for example, a vehicle interposing itself between the succeeding vehicle and another preceding vehicle, or a preceding vehicle in an adjacent lane into which the succeeding vehicle switches. The control determines the inter-vehicle spacing between the succeeding vehicle and the new preceding vehicle and attenuates the deceleration function when a predetermined inter-vehicle spacing is violated.

In accordance with one aspect of the present invention, the attenuation of the deceleration function is effective for a predetermined interval following the introduction of a new preceding vehicle into the path of the succeeding vehicle.

In accordance with another aspect of the invention, a driver alert, such as a visual and/or aural indicator, is activated when the inter-vehicle spacing between the succeeding vehicle and the new preceding vehicle is violated.

In accordance with a preferred implementation of the present invention, the succeeding vehicle monitors inter-vehicle spacing between it and preceding vehicles such as by conventional adaptive cruise radar or laser systems. Introduction of new preceding vehicles is determined from inordinate changes in inter-vehicle spacing. For example, changes in the neighborhood of 5.0 meters may be used to indicate the acquisition of a new preceding vehicle.

In accordance with a preferred aspect of the present invention, the deceleration function is inversely responsive to inter-vehicle spacing and the attenuation of the deceleration function attenuates this inverse responsiveness thereto. Additionally, the deceleration function may be responsive to the time rate of change of inter-vehicle spacing and/or deceleration of the preceding vehicle also. It is generally preferred, though not necessary, to limit the attenuation of the deceleration function to the inter-vehicle spacing term.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
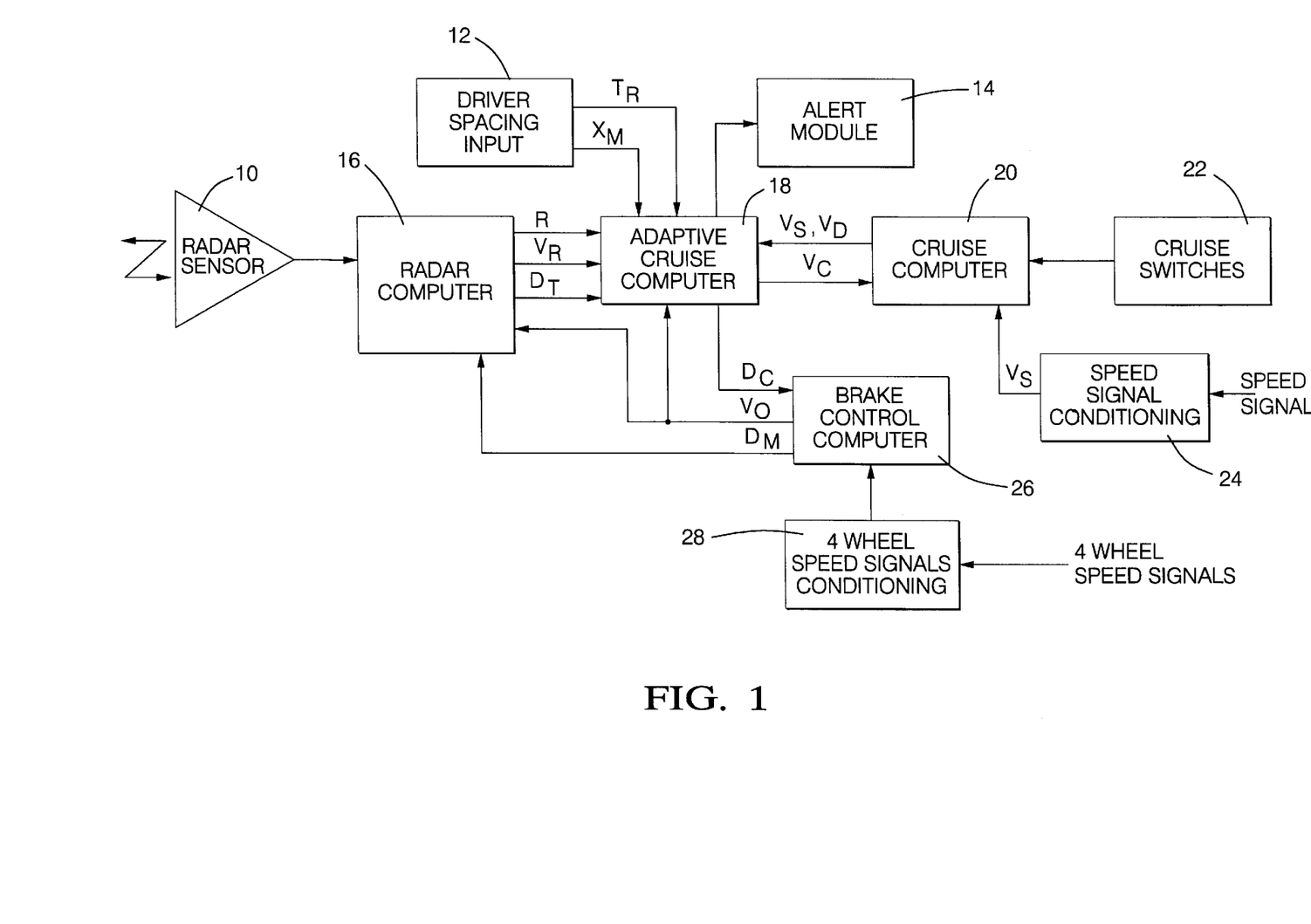
FIG. 1 is a block diagram of an adaptive cruise control system suitable for implementation of the present invention.

The succeeding vehicle includes an adaptive cruise control system as generally illustrated in FIG. 1. The system has a conventional cruise computer 20 which operates in response to conventional operator controlled switches such as an on/off switch, a set switch, a resume/accelerate switch, and a brake switch, all of which are represented in the aggregate as cruise switches 22. Speed signal conditioning circuit 24 supplies cruise computer 20 with succeeding vehicle velocity $V_S$ derived from a conditioned raw speed signal indicative of succeeding vehicle speed. The raw speed signal may, for example, be from a conventional rotational speed transducer arrangement such as a variable reluctance sensor cooperating with a toothed gear rotating with the output shaft of the vehicle transmission. Cruise computer 20 also receives a speed command $V_C$ from the adaptive cruise computer 18. The cruise computer uses the speed command $V_C$ and vehicle speed $V_S$ in a conventional closed loop control of the vehicle speed through throttle control. Cruise computer 20 also provides to adaptive cruise computer 18 the vehicle speed $V_S$ and the desired operator set speed $V_D$.

Adaptive cruise computer 18 also interfaces with a brake control computer 26 and radar computer 16 as illustrated. Preferably, additional operator interfacing is accomplished by way of a driver spacing input 12 and alert module 14 as later described. Brake control computer 26 receives a deceleration command $D_C$ from adaptive cruise computer 18 and provides a measure of vehicle speed $V_O$ derived from wheel speed sensing to the adaptive cruise computer 18. The wheel speed sensing is accomplished by way of a four wheel speed signal conditioning circuit 28 operating upon four individual, raw wheel speed signals, one for each of four wheels of the vehicle. The raw wheel speed signals may be provided for example by way of well known variable reluctance wheel speed sensors. All four conditioned signals are provided to brake control computer 26 and may be used thereby in performing traction applications such as anti-lock braking, traction control, and may include advanced features such as active braking and vehicle yaw control. The vehicle speed $V_O$ provided to adaptive cruise control computer 18 is derived from the four discrete wheel speed signals as a predetermined function. The brake control computer additionally provides the vehicle speed $V_O$ and a measured deceleration $D_M$ of the succeeding vehicle—also derived as a predetermined function of the four discrete wheel speed signals—to the radar computer 16. An exemplary brake control computer providing ABS and traction control functions, and suitable for application to the present invention, is commercially available from Delphi Chassis Systems and is generally identified as Electronic Brake and Traction Control Module. Also, an exemplary brake control computer providing additional advanced control functions including active brake control and vehicle yaw control, and suitable for application to the present invention, is commercially available from Delphi Chassis Systems and is generally identified as ICS II Integrated Chassis Controller.

A conventional radar computer 16 provides to the adaptive cruise computer 18 a variety of signals related to an in-path preceding vehicle. Radar sensor 10 provides output signals to radar computer 16 which derives the distance or range R between the succeeding and preceding vehicles, the closing or relative velocity $V_R$ between the preceding and succeeding vehicles (also known as the range rate), and the preceding vehicle deceleration $D_T$. Preceding vehicle deceleration may be provided as a function of the relative deceleration between the succeeding and preceding vehicles, which is derived in the radar computer 16 from the range R and range rate $V_R$, and the measured deceleration $D_M$ of the succeeding vehicle supplied by the brake control computer.

As previously alluded to, additional preferred operator interfacing with the adaptive cruise computer is accomplished by way of driver spacing input 12 and alert module 14. Driver spacing input 12 may take the form of a detented or continuously variable potentiometer whose operator controlled setting corresponds to a desired minimum inter-vehicle spacing $X_M$ and operator reaction time $T_R$. The alert module 14 may take the exemplary form of a vehicle instrument cluster or other display panel visual and/or audible alerting apparatus for conveying predetermined adaptive cruise control system information to the succeeding vehicle operator.

The cruise computer 20, adaptive cruise computer 18, radar computer 16 and brake control computer 26 are general purpose digital computers generally including a microprocessor, ROM, RAM, and I/O including A/D and D/A. Each respective computer has a set of resident program instructions stored in ROM and executed to provide the respective functions of each computer. The information transfer between the various computers, while schematically illustrated in FIG. 1 as individual data lines, is preferably accomplished by way of serial data links.

Figure 2:
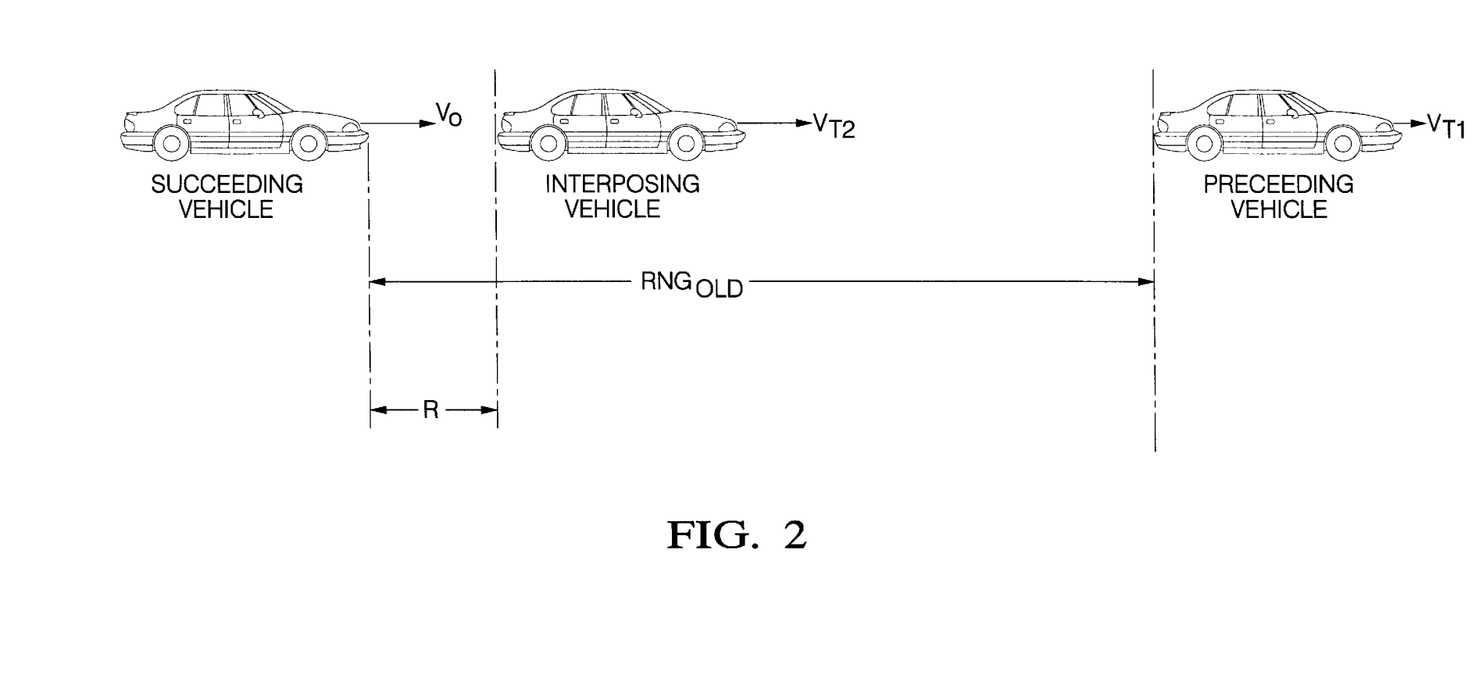
FIG. 2 is a schematic representation of relative positions of preceding, succeeding and interposing vehicles; and, FIGS. 3 through 5 are flow charts representing instruction sets executed by the adaptive cruise computer illustrated in FIG. 1 for carrying out the control of the present invention.

With brief reference to FIG. 2, an exemplary vehicle maneuver is illustrated wherein, prior to the maneuver, a preceding vehicle is traveling at a velocity $V_{T1}$. A succeeding vehicle, which in this case is the vehicle subject to control by an adaptive cruise control system of the variety being described, is traveling in the same lane as the preceding vehicle at a velocity $V_O$. Prior to the maneuver, the succeeding vehicle is separated from the preceding vehicle by an inter-vehicle spacing $RNG_{OLD}$. An interposing vehicle traveling at a velocity $V_{T2}$ maneuvers from an adjacent lane to be interposed between the succeeding and preceding vehicles. The succeeding vehicle is now separated from the interposing vehicle by an inter-vehicle spacing R. The illustrated and described maneuver is characterized by an inordinate change in inter-vehicle spacing. The inordinate change in inter-vehicle spacing is expressed as substantially $RNG_{OLD}$-R. If the preceding vehicle is not acquired by the radar, that is to say outside the acquisition range of the radar, then $RNG_{OLD}$ is substantially equivalent to a preset maximum value preferably corresponding to the radar acquisition limits.

Alternatively, a vehicle maneuver wherein the interposing vehicle represents the vehicle subject to control by an adaptive cruise control system also would result in an inordinate change in inter-vehicle spacing, expressed as substantially $RNG_{OLD}$-R; however, in this case $RNG_{OLD}$ represents the pre-maneuver inter-vehicle spacing between the interposing vehicle and another vehicle (not illustrated) or the preset maximum value, and R represents the post-maneuver inter-vehicle spacing between interposing and preceding vehicles.

In accordance with one aspect of the cut-in management of the present invention, the acquisition of a new preceding in-path vehicle distinct from the previously acquired preceding vehicle is determined by recognizing inordinate changes in inter-vehicle spacing. Essentially, the rapidity of change in inter-vehicle spacing is deemed to be unobtainable but for the relative imposition of another vehicle into the path of the succeeding vehicle. The occurrence of the inordinate change in inter-vehicle spacing provides for the recognition of the newly acquired preceding vehicle as a "new target" for an interval sufficient to manage a cut-in appropriately. In accordance with a preferred manner of detecting a new target, range data from the radar computer is analyzed directly for example from one control loop iteration to the next. An alternative primary manner of detecting a new target may analyze range rate data from the radar computer. However, conventional filtering techniques applied to range rate data may preclude primary detection in this latter manner.

Figure 3:
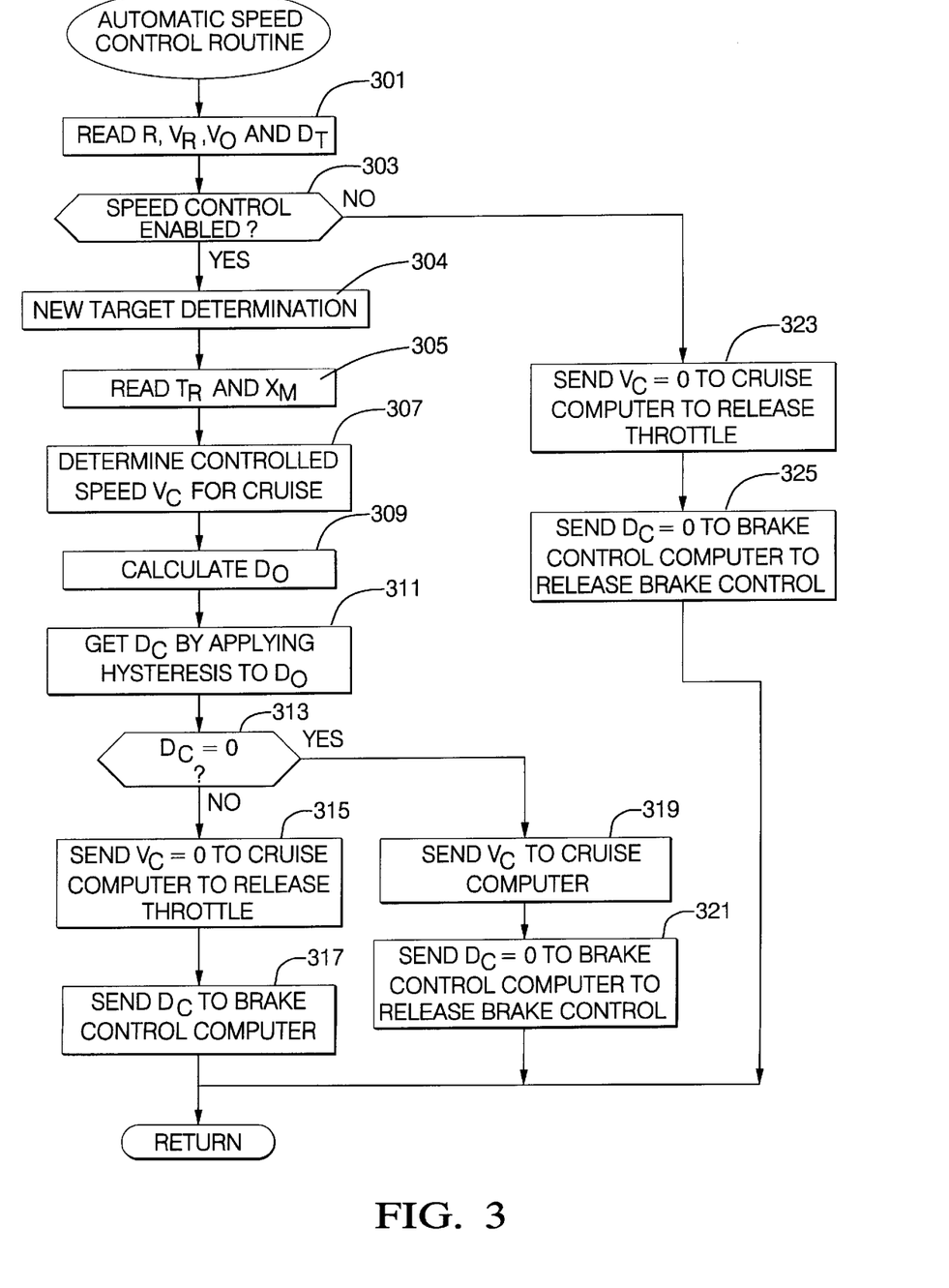
Figure 4:
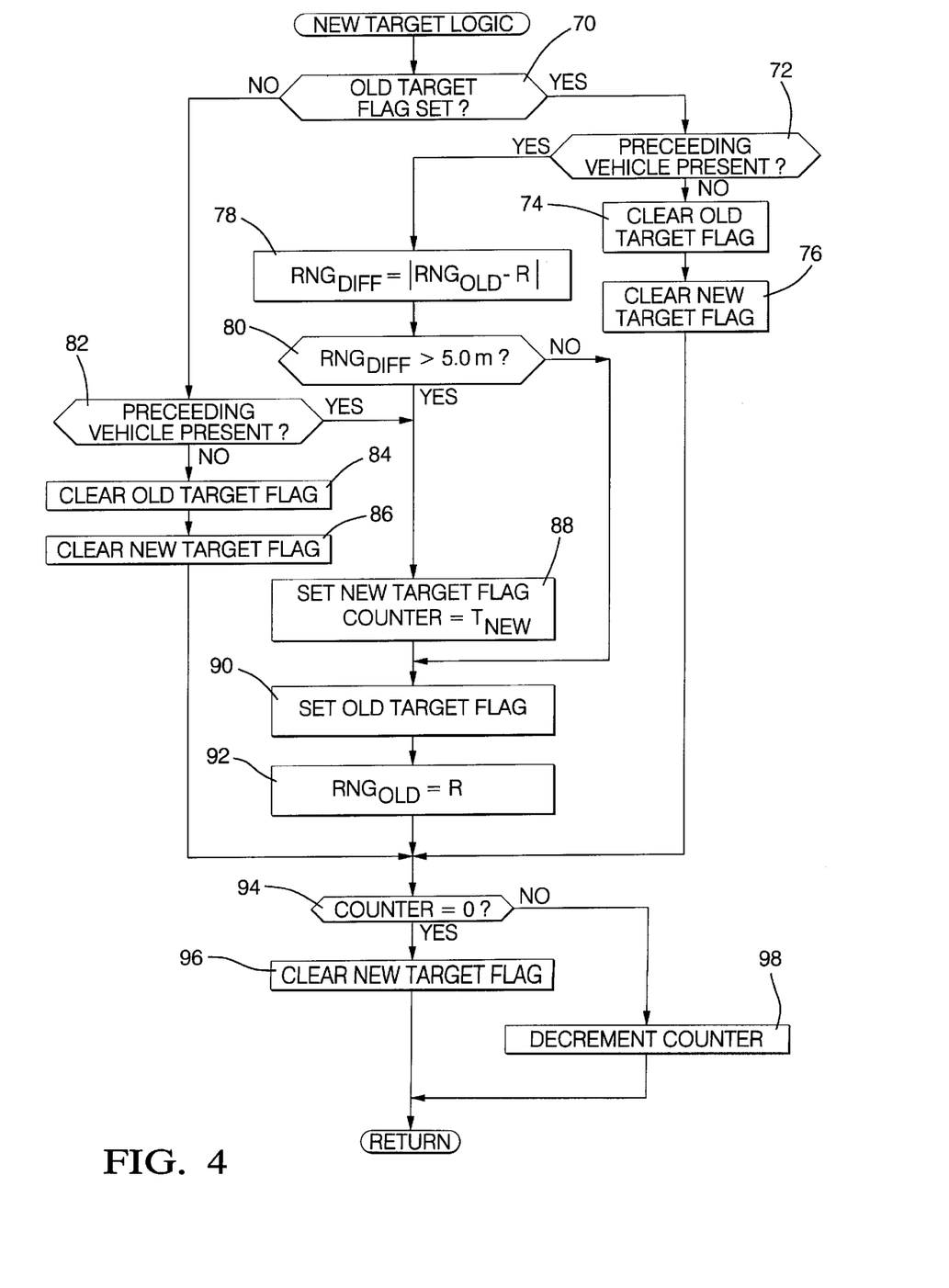
Figure 5:
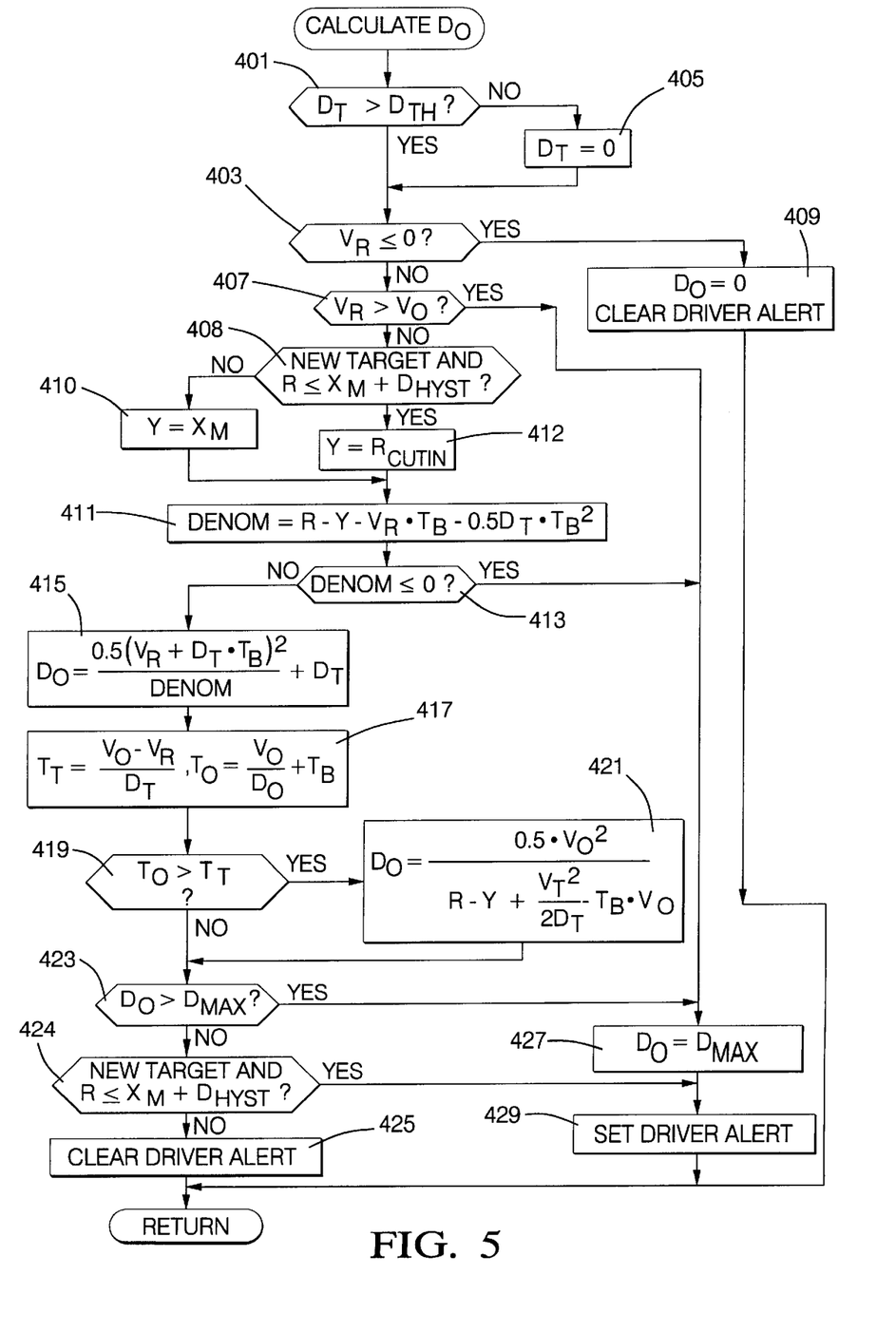

With reference now to FIGS. 3 through 5, flow charts representing sets of steps or program instructions for execution by the adaptive cruise computer 18 of FIG. 1 are shown. The illustrated steps form part of a larger set of instructions executed by the adaptive cruise computer in carrying out other adaptive cruise control functions. For example, initialization steps including setting timers, flags, tables and pointers etc. are carried out when the adaptive cruise computer is first powered up such as at the beginning of a vehicle ignition cycle. Thereafter, a background loop comprising repetitively executed functions such as acquisition and conditioning of inputs, providing outputs, and updating of timers and counters is executed.

In one form of the invention, the steps embodied in the flow diagrams of FIGS. 3 through 5 are executed on a real time interrupt basis every 50 msec. Working variable registers for inter-vehicle spacing R, relative velocity $V_R$ between the preceding and succeeding vehicles (also known as the range rate), succeeding vehicle velocity $V_O$, and the preceding vehicle deceleration $D_T$ are updated at block 301 from input buffers which are updated at various rates in accordance with the particular source of the data. For example, in one implementation, the radar computer 16 updates the inter-vehicle spacing R, relative velocity $V_R$, and preceding vehicle deceleration $D_T$ approximately every 100 msec while the brake control computer 26 updates the succeeding vehicle velocity $V_O$ approximately every 50 msec.

Block 303 next determines if the speed control is activated requiring further execution of program instructions related to the adaptive cruise control functions of the present invention. If cruise is not enabled, blocks 323 and 325 execute program steps to release control of the throttle and brakes by setting the speed command $V_C$ and deceleration command $D_C$, respectively, to zero. The routine then exits the interrupt to continue normal background loop functions.

If, however, cruise is enabled, block 303 passes control to block 304 whereat a set of program instructions is executed to determine whether the preceding vehicle, if any, acquired by the radar is the same as in previous iterations. Block 304 returns a NEW TARGET FLAG which is set only in the case of a new preceding vehicle being acquired by the radar. Generally, a new target is acquired when a vehicle from an adjacent lane moves into the radar path between the succeeding and preceding vehicle or when the preceding vehicle in the radar path moves into an adjacent lane and the radar acquires a same-lane vehicle which lead the preceding vehicle prior to the lane change. Such will generally result in a step change to the inter-vehicle spacing of at least one vehicle length. The same relative effect and new target determination may be made by the succeeding vehicle changing lanes and capturing a new preceding vehicle with an inter-vehicle spacing greater than or less than the previously acquired preceding vehicle prior to the lane change.

It is recognized that certain scenarios may present special cases in new target determination. For example, the succeeding vehicle may change lanes behind a new preceding vehicle at substantially the same inter-vehicle spacing as the previously acquired preceding vehicle prior to the lane change. That is to say, any step change to the inter-vehicle spacing is not significant enough relative to the calibrations of the control to be discerned as inordinate. Such scenarios are more likely to occur in systems having wider angular resolutions or capture angle whereby lane transitions may occur without loss of one preceding vehicle prior to capture of the next preceding vehicle. New target determination may be accomplished in these scenarios by way of satisfaction of change in range rate criteria. Therefore, scenarios wherein the succeeding vehicle changes its path into an adjacent lane with a new preceding vehicle traveling at a different rate than the preceding vehicle in the lane just exited, yet characterized by a new inter-vehicle spacing not significant enough itself to be discerned as a new target event in accord with range criteria, may be discerned as a new target event in accord with range rate criteria. Of course, where both such adjacent lane preceding vehicles are closely matched in both respective inter-vehicle spacings and range rates relative to the succeeding vehicle, it may be academic to state that a new target may not be discerned, nor may it be advantageous to distinguish between the two scenarios having such similar characteristics. Additionally, systems having narrower angular resolutions or capture angles whereby lane transitions may occur with loss of one preceding vehicle prior to capture of the next preceding vehicle may inherently resolve the loss/capture progression as a new target event thus rendering range rate based new target discernment processing superfluous. The program steps embodying an exemplary new target determination based upon inordinate changes in range are detailed in the flow diagram of FIG. 4 later described.

After block 304 returns the NEW TARGET FLAG, block 305 executes a set of program instructions to read the desired minimum inter-vehicle spacing $X_M$ and operator reaction time $T_R$. Next, step 307 determines the speed command $V_C$ in accordance with known methods of adaptive cruise control which reacts to preceding vehicles. For example, the adaptive cruise control as disclosed in U.S. Pat. Nos. 5,014,200 and 5,173,859 to Chundrlik et al. and Deering, respectively, and which are assigned to the assignee of the present invention provide exemplary known control methods. Generally, such control methods perform as conventional speed control systems maintaining an operator set speed in the absence of a preceding vehicle. The presence of a preceding vehicle, however, results in adaptation of the vehicle speed to maintain a controlled inter-vehicle spacing when the preceding vehicle is traveling at or less than the set speed. Deceleration of the vehicle is accomplished by way of throttle release in accordance with a commanded vehicle speed.

Block 309 represents the steps of FIG. 5 to be later described which calculate the desired deceleration $D_O$ of the succeeding vehicle in accordance with the cut-in management of the present invention. Block 311 applies conventional hysteresis techniques to the desired deceleration $D_O$ to arrive at a deceleration command $D_C$ for the brake control computer. The hysteresis applied to the desired deceleration $D_O$ advantageously prevents excessive throttle and brake interaction. Additionally, the hysteresis is effective to ignore values of desired deceleration $D_O$ that are significantly below a predetermined or calibrated value for level-road, closed-throttle deceleration. One such calibrated value which has successfully been implemented is approximately 0.5 m/s². Also, in the situation where a preceding vehicle is no longer present such as when it moves into an adjacent lane, the deceleration command $D_C$ is slowly decreased to zero to provide a smooth transition back to throttle control.

Block 313 determines if a deceleration by way of brake control is desired by checking the value of the deceleration command. If the deceleration command $D_C$ is zero, brake control is not desired and steps 319 and 321 are executed. This branch is the desired path where a cut-in maneuver is effectuated at reasonable inter-vehicle spacing, with substantially matched velocity and limited preceding vehicle deceleration. Block 319 sends to the cruise computer the previously calculated speed command $V_C$ for conventional closed loop speed control operating on vehicle speed $V_S$ and the speed command $V_C$. Block 321 similarly sends to the brake control computer the null deceleration command $D_C$ to effectuate complete release of the service brakes. If, however, a non-zero value for deceleration command $D_C$ is current, blocks 315 and 317 are executed. Block 315 on the other hand sends to the cruise computer a null speed command $V_C$ to effectuate complete release of throttle control. Block 317 sends to the brake control computer the previously calculated deceleration command $D_C$ to effectuate the desired application of the service brakes.

With reference now to the flow diagram illustrated in FIG. 4, a series of exemplary steps for discerning the character of a preceding vehicle is illustrated. The purpose of the routine is to provide a temporal indicator of the radar acquiring a new target. In other words, an indication of a new preceding vehicle is indicated for a predetermined interval after which the preceding vehicle is no longer indicated as being new.

Beginning first with block 70, a determination is made whether the previous pass through the routine had recognized the presence of a preceding vehicle by the radar. This is accomplished in the illustrated embodiment as a check on the status of an OLD TARGET flag. A set state in the present example indicates the recent historical presence of a preceding vehicle within the acquisition range of the radar while a cleared or reset state in the present example indicates the recent historical absence of a preceding vehicle within the acquisition range of the radar. Assuming the previous iteration of the routine recognized the presence of a preceding vehicle, block 72 is executed to determine whether the radar continues to sense a preceding vehicle. This may most readily be deduced by checking if the range (inter-vehicle spacing) information is within predetermined acquisition limits. Where no preceding vehicle is sensed, steps 74 and 76 are executed to clear or reset OLD TARGET and NEW TARGET flags, respectively.

Returning to decision block 72, if a preceding vehicle is sensed, block 78 is executed whereat the change in inter-vehicle spacing ($RNG_{DIFF}$) from one iteration to another is calculated as the absolute value of the difference between the current and most recent historical inter-vehicle spacings, R and $RNG_{OLD}$ respectively. Next, block 80 discerns from the magnitude of the change in inter-vehicle spacing whether an inordinate change has occurred. This is accomplished by comparing $RNG_{DIFF}$ to a predetermined calibrated value, 5.0 meters in the example. A change in inter-vehicle spacing in excess of the calibrated value is indicative of a newly acquired preceding vehicle causing, at step 88, the setting of the NEW TARGET flag, and initialization of a new target interval counter (COUNTER) to a predetermined value ($T_{NEW}$). Otherwise, a change not greater than the calibrated value will bypass the setting of the NEW TARGET flag. In either case, steps 90 and 92 are next executed to set the OLD TARGET flag and to update the most recent historical inter-vehicle spacing for the next iteration as the current inter-vehicle spacing, respectively.

Returning to decision block 70, where the previous iteration of the routine recognized the absence of a preceding vehicle, block 82 is executed to determine whether the radar now senses a preceding vehicle. Again, this may most readily be deduced by checking if the range (inter-vehicle spacing) information is within predetermined acquisition limits. Where no preceding vehicle is sensed, steps 84 and 86 are executed to clear or reset OLD TARGET and NEW TARGET flags, respectively. If, however a preceding vehicle is sensed, block 88 will cause the setting of the NEW TARGET flag indicating a newly acquired preceding vehicle, and initialization of the new target interval counter COUNTER to the predetermined value $T_{NEW}$. Execution of block 88 is then followed by execution of steps 90 and 92 to set the OLD TARGET flag and to update the most recent historical inter-vehicle spacing for the next iteration as the current inter-vehicle spacing, respectively.

Following any of the previously described flow chart branches of FIG. 4, expiration of the new target interval is checked at step 94. Where COUNTER is equivalent to zero, the new target interval is determined to have expired and block 96 clears the NEW TARGET flag. Where the new target interval is not equivalent to zero, the new target interval has not expired and a decrementing of COUNTER is performed by block 98. After either blocks 96 or 98 is executed, the routine is exited and returns to block 304 in FIG. 3.

With reference specifically to FIG. 5, a flow chart is illustrated representing instruction sets executed by the adaptive cruise control computer for determination of a desired deceleration for the succeeding vehicle. The output of the routine of FIG. 5 is integrated into the routine of FIG. 3 at block 309 as previously described. Calculation of an appropriate deceleration response for management of vehicle cut-ins is performed by the steps illustrated in FIG. 5 as follows. First, a series of conditional steps are executed to determine the appropriateness of the execution of the calculative instructions generally represented by blocks 411–427. Block 401 is executed to determine whether a significant preceding vehicle deceleration $D_T$ has been detected by comparing it to a predetermined threshold $D_{TH}$. The threshold may be a single calibrated value, for example 0.75 m/s$^2$. Where the preceding vehicle deceleration $D_T$ is not significant, it is set to a null value of zero at step 405 and processing continues at block 403; otherwise, the preceding vehicle deceleration $D_T$ is not altered prior to block 403 being executed. Conventional hysteresis can be applied to the threshold to allow values lower than 0.75 m/s$^2$ to be used once the preceding vehicle deceleration $D_T$ has exceeded 0.75 m/s$^2$ with values lower than an absolute minimum, for example 0.5 m/s$^2$, always causing the preceding vehicle deceleration $D_T$ to be set to a null value of zero at step 405. At block 403, a check is made to determine if the vehicles are closing or opening. The range between the vehicles may be increasing even if the preceding vehicle is decelerating where the velocity of the preceding vehicle exceeds that of the succeeding vehicle. If the range is increasing, block 409 is executed to set the desired deceleration to zero and to clear or cause to be cleared any appropriate driver alert, whereafter, the remaining steps in FIG. 5 are bypassed, and the routine is exited. However, where the range is decreasing, indicating that the succeeding vehicle is closing in on the preceding vehicle, block 407 is next encountered. At block 407, a check is performed to determine if the preceding vehicle is an on-coming vehicle. This is accomplished by determining if the range rate exceeds the succeeding vehicle velocity. Stationary objects will have a range rate equivalent to the succeeding vehicle velocity, while preceding vehicles having the same sense of direction as the succeeding vehicle will have a range rate less than the succeeding vehicle velocity. An oncoming target therefore results in execution of step 427 to set the desired deceleration $D_O$ to a predetermined maximum deceleration $D_{MAX}$ and setting any appropriate driver alert, whereafter the routine is exited. When the succeeding vehicle is closing on the preceding vehicle and the range rate is equal to or less than the succeeding vehicle velocity, block 408 is executed.

Block 408 determines if the conditions following discernment of a new target warrant intervention of the cut-in control of the present invention. Two determinations are made at block 408. First, the expiration of the new target interval as embodied in the state of the NEW TARGET flag is checked. Second, the post maneuver proximity of the succeeding vehicle to the preceding vehicle is checked. If the preceding vehicle is still considered to be new (i.e. the new target interval is active) and the inter-vehicle spacing does not exceed a predetermined cut-in threshold, it is assumed that a management peculiar to the sensed cut-in maneuver is appropriate and block 412 is executed. If either the new target interval has expired or the inter-vehicle spacing is at least equivalent to the predetermined cut-in threshold, no special cut-in processing is deemed to be advantageous.

In the present exemplary embodiment, the customary adaptive cruise control management essentially calculates a deceleration term which may be implemented by way of appropriate throttle and or brake control as described with respect to the flow diagram of FIG. 3. The deceleration term as determined in this embodiment incorporates an inverse responsiveness of the calculated deceleration to inter-vehicle spacing among other considerations.

Block 410, executed from block 408 when the conditions for a cut-in are not satisfied, sets mode-dependent minimum desired inter-vehicle spacing Y to the desired minimum inter-vehicle spacing $X_M$ in accord with the customary deceleration calculation of the present embodiment. Block 412 on the other hand, executed from block 408 when the conditions for a cut-in are satisfied, sets mode-dependent desired minimum inter-vehicle spacing Y to a predetermined adaptive cut-in spacing ($R_{CUTIN}$) in accord with a cut-in deceleration calculation of the present embodiment. The predetermined cut-in threshold bears a direct relationship to inter-vehicle spacings whereat substantial deceleration would be commanded without regard to the characteristics of the closing rate or preceding vehicle deceleration. Generally, the smaller the inter-vehicle spacing, the more aggressive the calculated deceleration becomes. This is due to the desirability of providing deceleration responses which are inversely related to inter-vehicle spacing. At a certain spacing, corresponding to the desired minimum inter-vehicle spacing in the present example, a maximum deceleration command is issued. As the post-maneuver inter-vehicle spacing approaches the desired minimum inter-vehicle spacing, the likelihood of overly aggressive decelerations with respect to minimal or insubstantial closing rates or preceding vehicle decelerations increases. Therefore, the predetermined cut-in threshold is chosen in the example as the desired minimum inter-vehicle spacing $X_M$ augmented by an incremental spacing value $D_{HYST}$. Therefore, when the post-maneuver inter-vehicle spacing is no greater than the cut-in threshold, the mode-dependent desired minimum inter-vehicle spacing Y is set to the adaptive cut-in spacing $R_{CUTIN}$.

The predetermined adaptive cut-in spacing $R_{CUTIN}$ is chosen to be less that the desired minimum inter-vehicle spacing $X_M$ which, as stated, is normally sought in the absence of a cut-in maneuver. The adaptive cut-in spacing $R_{CUTIN}$ may be, for example, set to a predetermined value such as 5.0 meters or may be set as a predetermined function of $X_M$ to vary in accordance with an operator controlled setting. Therefore, the mode-dependent desired minimum inter-vehicle spacing Y effectuates a desired attenuation of the inverse responsiveness of the system to inter-vehicle spacing in cases of cut-in maneuvers. It is noted, however, that other parameters affecting the deceleration response characteristics of the system, namely closing rate and preceding vehicle deceleration in the present example, are not altered which effectuates continued first order responsiveness to these quantities.

Block 411 next performs calculations to determine the allotted amount of closing space in which the deceleration of the succeeding vehicle may take place. This amount is in accordance with the brake reaction interval $T_B$ and the mode-dependent desired inter-vehicle spacing Y which itself is equivalent to one of $X_M$ and $R_{CUTIN}$. The inter-vehicle spacing as measured is the starting base value which is reduced by the mode-dependent desired minimum inter-vehicle spacing Y, the amount of inter-vehicle spacing closed during the brake reaction interval in accord with range rate (closing rate), and preceding vehicle deceleration. The calculated value, DENOM, is checked at block 413 to determine if the inter-vehicle spacing projected at the termination of the brake reaction interval is at or violates the mode-dependent desired minimum inter-vehicle spacing Y. Negative values returned for DENOM indicate violation, and a zero returned value indicates that the inter-vehicle spacing is at the mode-dependent desired minimum value. Hence, where DENOM is less than or equal to zero, the inter-vehicle spacing is insufficient to support deceleration of the succeeding vehicle in accord with the objective of preventing violation of the mode-dependent desired minimum inter-vehicle spacing Y, and block 427 is invoked to set the desired deceleration $D_O$ to the predetermined maximum deceleration $D_{MAX}$, and set any appropriate driver alert.

Where at least some inter-vehicle spacing is available in which to perform deceleration of the succeeding vehicle, block 415 is executed to calculate a first succeeding vehicle deceleration, $D_O$. $D_O$ consists of a deceleration matching term, $D_T$, and an incremental deceleration term. DENOM as previously calculated appears as the denominator of the incremental deceleration term and hence the term varies inversely therewith. In other words, relatively small closing space results in relatively large incremental decelerations and vice-versa. The closer the succeeding vehicle is to the preceding vehicle following the cut-in maneuver, the larger will be the incremental deceleration term. However, the responsiveness of the incremental deceleration term to relatively small inter-vehicle spacing has been attenuated in accordance with the adaptive cut-in spacing $R_{CUTIN}$ substitution into the mode-dependent desired minimum inter-vehicle spacing Y. The inclusion of the preceding vehicle deceleration $D_T$ in the equation ensures that for any value of incremental deceleration, the respective velocity profiles of the vehicles converge. Blocks 417 and 419 next determine if the convergence of vehicle velocity at the calculated succeeding vehicle deceleration $D_O$ occurs at a positive velocity, or put another way if the succeeding vehicle reaches zero velocity before the preceding vehicle reaches zero velocity. Times for the preceding and succeeding vehicles to reach zero velocity are calculated as $T_T$ and $T_O$, respectively, at block 417. Block 419 then compares the two times to determine the projected order of the vehicles reaching zero velocity at the respective decelerations as determined.

Where the preceding vehicle is projected to reach zero velocity after the succeeding vehicle, the first calculated deceleration $D_O$ is determined to be sufficient to prevent the vehicles from getting any closer than the mode-dependent desired minimum inter-vehicle spacing Y. In fact, the time at which the velocities match is the time at which the inter-vehicle spacing is at a minimum corresponding to the mode-dependent desired minimum inter-vehicle spacing Y. The final or at rest inter-vehicle spacing, however, will be greater than the mode-dependent desired minimum inter-vehicle spacing Y since after the velocities match the spacing opens as the succeeding vehicle velocity is below the preceding vehicle velocity.

Where the preceding vehicle is projected to reach zero velocity prior to the succeeding vehicle, block 421 calculates a second succeeding vehicle deceleration, $D_O$, to cause the final or at rest inter-vehicle spacing to be the mode-dependent desired minimum inter-vehicle spacing Y. Alternative final inter-vehicle spacing may be substituted for Y if desired.

In either the case where the first or second calculated succeeding vehicle velocity remains active after block 419, block 423 next determines if the calculated deceleration exceeds a predetermined maximum deceleration, $D_{MAX}$, which generally represents a fixed calibration limit or alternatively a variable limit which corresponds to an operator controlled setting. Calculated succeeding vehicle deceleration equal to or in excess of $D_{MAX}$ results in block 427 setting $D_O$ to the maximum limit and block 429 setting any appropriate driver alert. On the other hand, where the calculated deceleration $D_O$ is within the predetermined deceleration limit, block 424 determines if a cut-in situation is active. In other words, if the NEW TARGET flag is set and the inter-vehicle spacing violates the predetermined cut-in threshold, a cut-in situation is deemed to be active and block 429 is executed to activate any appropriate driver alert. An alert of this nature informs the operator that a relatively close, slower moving vehicle now precedes and that the system response characteristics have been altered from the response characteristics prior to the perceived cut-in. The operator is thereby alerted to the potential desirability of manual intervention should he determine intervention to be prudent. The alert is also advantageous in certain situations where a target vehicle is dropped then recaptured by the radar and thereby discerned as a new target. For example, loss and recapture of a preceding vehicle within the previously described cut-in threshold may result in a sudden reduction in deceleration when the preceding vehicle is recaptured and the situation discerned as a cut-in situation. Such loss/recapture situations may occur for example due to the sudden changes and recovery in succeeding vehicle attitude when encountering chuck holes severe enough to temporally deflect substantial radar energy away from the preceding vehicle.

If a cut-in situation is not indicated at block 424, block 425 clears any driver alerts. The routine of FIG. 5 exits to the routine of FIG. 3 at block 309 wherein the calculated deceleration $D_O$ is returned for application to the brake control computer as described.

While the invention has been described with respect to certain preferred embodiments, it is anticipated that certain modifications, changes and substitutions may be apparent to one having ordinary skill in the art. Therefore, the description of the embodiments contained herein are given by way of non-limiting example.

What is claimed is:

1. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of the succeeding vehicle, the method comprising;
   discerning the introduction of a new preceding vehicle into the path of the succeeding vehicle;
   determining a new inter-vehicle spacing subsequent to the introduction of the new preceding vehicle; and,
   attenuating the inverse responsiveness of the deceleration function when the new inter-vehicle spacing does not exceed a predetermined inter-vehicle spacing.

2. The method of managing deceleration as claimed in claim 1 wherein said step of attenuating the inverse responsiveness of the deceleration function is further only effective for a predetermined interval following discerning the introduction of the new preceding vehicle into the path of the succeeding vehicle.

3. The method of managing deceleration as claimed in claim 1 further including the step of activating a driver alert when the new inter-vehicle spacing does not exceed the predetermined inter-vehicle spacing.

4. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of succeeding vehicle travel, the method comprising:
   monitoring inter-vehicle spacing between the succeeding vehicle and preceding vehicles;
   determining introduction of new preceding vehicles from inordinate changes in inter-vehicle spacing;
   when inter-vehicle spacing between the succeeding vehicle and new preceding vehicles is less than a predetermined spacing, attenuating the inverse responsiveness of the predetermined deceleration function during a predetermined interval following introduction of new preceding vehicles.

5. The method of managing deceleration as claimed in claim 4 further including the step of activating a driver alert when inter-vehicle spacing between the succeeding vehicle and new preceding vehicles is less than the predetermined spacing.

6. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of succeeding vehicle travel, the method comprising:
   monitoring inter-vehicle spacing between the succeeding vehicle and preceding vehicles;
   determining introduction of new preceding vehicles from inordinate changes in inter-vehicle spacing;
   when inter-vehicle spacing between the succeeding vehicle and new preceding vehicles is less than a predetermined spacing, attenuating the inverse responsiveness of the predetermined deceleration function during a predetermined interval following introduction of new preceding vehicles wherein the inverse responsiveness of the function to inter-vehicle spacing is attenuated as a function of a predetermined desired minimum inter-vehicle spacing.

7. The method of managing deceleration of a succeeding vehicle as claimed in claim 6 wherein the desired minimum inter-vehicle spacing is determined in accord with an operator setting.

8. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of succeeding vehicle travel, the method comprising:
   monitoring inter-vehicle spacing between the succeeding vehicle and preceding vehicles;
   determining introduction of new preceding vehicles from inordinate changes in inter-vehicle spacing;
   when inter-vehicle spacing between the succeeding vehicle and new preceding vehicles is less than a predetermined spacing, attenuating the inverse responsiveness of the predetermined deceleration function during a predetermined interval following introduction of new preceding vehicles wherein the predetermined deceleration function is further responsive to at least one of (a) time rate of change of inter-vehicle spacing and (b) deceleration of the preceding vehicle.

9. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of succeeding vehicle travel, the method comprising:

detecting the presence of a preceding vehicle;

determining inter-vehicle spacing;

determining whether the preceding vehicle was recently acquired as a function of a time rate of change of inter-vehicle spacing; and, attenuating the inverse responsiveness of the deceleration function during a predetermined interval following acquisition of recently acquired preceding vehicles as a function of inter-vehicle spacing.

10. The method of managing deceleration as claimed in claim 9 further including the step of activating a driver alert when inter-vehicle spacing between the succeeding vehicle and recently acquired preceding vehicles is less than a predetermined spacing.

11. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of the succeeding vehicle, the method comprising;

discerning the introduction of a new preceding vehicle into the path of the succeeding vehicle;

determining a new inter-vehicle spacing subsequent to the introduction of the new preceding vehicle; and, attenuating the inverse responsiveness of the deceleration function when the new inter-vehicle spacing does not exceed a predetermined inter-vehicle spacing wherein the inverse responsiveness of the function to inter-vehicle spacing is attenuated as a function of a predetermined desired minimum inter-vehicle spacing.

12. A method of managing deceleration of a succeeding vehicle as claimed in claim 11 wherein the desired minimum inter-vehicle spacing is determined in accord with an operator setting.

13. A method of managing deceleration of a succeeding vehicle having an adaptive cruise control system adapted for active deceleration of the succeeding vehicle in accordance with a predetermined deceleration function characterized by inverse responsiveness to inter-vehicle spacing between the succeeding vehicle and preceding vehicles in the path of the succeeding vehicle, the method comprising;

discerning the introduction of a new preceding vehicle into the path of the succeeding vehicle;

determining a new inter-vehicle spacing subsequent to the introduction of the new preceding vehicle; and, attenuating the inverse responsiveness of the deceleration function when the new inter-vehicle spacing does not exceed a predetermined inter-vehicle spacing wherein the predetermined deceleration function is further responsive to at least one of (a) time rate of change of inter-vehicle spacing and (b) deceleration of the preceding vehicle.

* * * * *